United States Patent
Ito et al.

(10) Patent No.: US 7,999,477 B2
(45) Date of Patent: Aug. 16, 2011

(54) DEUTERIUM LAMP

(75) Inventors: Yoshinobu Ito, Shizuoka (JP); Masaki Ito, Shizuoka (JP); Koji Matsushita, Shiuoka (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 649 days.

(21) Appl. No.: 11/993,621

(22) PCT Filed: Aug. 8, 2006

(86) PCT No.: PCT/JP2006/315653
§ 371 (c)(1),
(2), (4) Date: Dec. 21, 2007

(87) PCT Pub. No.: WO2007/018206
PCT Pub. Date: Feb. 15, 2007

(65) Prior Publication Data
US 2010/0156263 A1    Jun. 24, 2010

(30) Foreign Application Priority Data
Aug. 10, 2005   (JP) ................ P2005-232455

(51) Int. Cl.
*H01J 17/16*   (2006.01)
*G01J 3/42*    (2006.01)

(52) U.S. Cl. .............. 313/634; 356/317; 313/573
(58) Field of Classification Search ........... 313/634, 313/573; 356/317; 250/374
See application file for complete search history.

(56) References Cited

U.S. PATENT DOCUMENTS

| | | | | |
|---|---|---|---|---|
| 3,937,576 | A | * | 2/1976 | Schmider ............. 356/300 |
| 4,016,445 | A | * | 4/1977 | Cassidy et al. ........ 313/637 |
| 4,076,420 | A | * | 2/1978 | De Maeyer et al. ..... 356/73 |

(Continued)

FOREIGN PATENT DOCUMENTS
JP      44-11713     5/1969
(Continued)

*Primary Examiner* — Peter Macchiarolo
(74) *Attorney, Agent, or Firm* — Drinker Biddle & Reath LLP

(57) ABSTRACT

The present invention relates to a deuterium lamp with a structure to enable high-accuracy positioning with respect to a mounting object such as an analyzer. The deuterium lamp comprises a sealed container in which a light-emitting portion to emit a discharge light in a predetermined direction is stored. The sealed container is constituted by a hollow body portion in which the light-emitting portion is stored and a hollow guide portion which guides a discharge light from the light-emitting portion to a light exit window provided at its front end. The deuterium lamp further comprises an axis adjusting member fixed to the hollow guide portion while storing at least a part of the hollow guide portion and a sealing layer for fixing the hollow guide portion and the axis adjusting member to each other. In particular, the sealing layer makes it possible to fix the axis adjusting member to the hollow guide portion with the center axis of the axis adjusting member being made coincident with the emitting direction of a discharge light. Thereby, even when misalignment has occurred between the center axis of the hollow guide portion and the emitting direction of a discharge light due to a manufacturing error in manufacturing of the container, since the axis adjusting member itself is directly fixed to the mounting object, it becomes possible to fix said deuterium lamp to an analyzer or the like with the optical axis aligned at a high accuracy.

12 Claims, 6 Drawing Sheets

U.S. PATENT DOCUMENTS

| | | | | |
|---|---|---|---|---|
| 4,241,998 A * | 12/1980 | Farkas et al. | ............... | 356/319 |
| 4,611,143 A * | 9/1986 | Shimazu et al. | ............... | 313/111 |
| 6,690,111 B1 * | 2/2004 | Davenport | ............... | 313/613 |
| 6,741,036 B1 * | 5/2004 | Ikedo et al. | ............... | 313/634 |

FOREIGN PATENT DOCUMENTS

| | | |
|---|---|---|
| JP | 54-156976 | 4/1978 |
| JP | 4-98777 | 3/1992 |
| JP | 6-215734 | 8/1994 |

\* cited by examiner

DEUTERIUM LAMP

TECHNICAL FIELD

The present invention relates to a deuterium lamp that emits light with a predetermined wavelength, and more particularly, to a deuterium lamp to be used as a light source of a spectroscope or the like in an analyzer.

BACKGROUND ART

Conventionally, as such spectroscopic light sources, deuterium lamps disclosed in Patent Document 1 and Patent Document 2 have been known. These deuterium lamps disclosed in Patent Document 1 and Patent Document 2 have light exit windows and are each arranged at a position where it becomes possible to emit light into a vacuum chamber of a mounting object (such as a spectroscope) via the light exit window. At this time, the deuterium lamp is fixed to a fixing portion provided on an outer wall or the like of the vacuum chamber whose inside is maintained in a vacuum state. For example, the deuterium lamp disclosed in Patent Document 1 comprises not only an anode and a cathode that generate an electric discharge but also a sealed container that stores the anode and cathode. The sealed container comprises a tube body and a cylindrical guide portion extending in a direction orthogonal to a center axis (tube axis) of this tube body that is an emitting direction of a discharge light. At the front end of the guide portion, a light exit window is provided. The guide portion is provided with an annular concave groove to be attached with an O-ring on its outer periphery surface. As a result of this guide portion of the deuterium lamp being fitted into the cylindrical fixing portion (an opening portion provided in the outer wall of the vacuum chamber), the deuterium lamp itself is attached to the mounting object, while the inside of the vacuum chamber of the mounting object is maintained in a vacuum state by being sealed airtight with the O-ring.

On the other hand, the deuterium lamp described in Patent Document 2 comprises not only an anode and a cathode but also a sealed container (tube body) that houses the anode and cathode. In addition, a light exit window is formed on one end side of the sealed container. A mouth ring is provided at one end of the sealed container, and this mount ring fixes the deuterium lamp described in Patent Document 2 to the fixing portion on the outer wall of the vacuum chamber of the mounting object.

[Patent Document 1] Japanese Utility Model Application Laid-Open No. S54-156976
[Patent Document 2] Japanese Patent Application Laid-Open No. H06-215734

DISCLOSURE OF THE INVENTION

Problem to be Solved by the Invention

The inventors have studied conventional arts in detail, and as a result, have found problems as follows.

That is, in the conventional deuterium lamp disclosed in the above Patent Document 1, misalignment might have occurred between the center axis (tube axis) and the optical axis of an emitted light (coincident with the emitting direction of a discharge light) due to a manufacturing error in manufacturing of the container. Therefore, when the deuterium lamp was to be attached to an analyzer or the like, the optical axis of an emitted light from said deuterium lamp was misaligned with respect to the mounting object even if the guide portion was fixed to the analyzer with accuracy, so that the deuterium lamp could not be attached at a sufficient accuracy (attached with the optical axis aligned at a high accuracy). In addition, the deuterium lamp was fixed to the mounting object as a result of its guide portion being fitted into the cylindrical fixing portion provided on the outer wall of the vacuum chamber of the mounting object. Therefore, due to a stress directly applied to the guide portion, the glass-made sealed container itself was likely to break.

On the other hand, for the conventional deuterium lamp described in the above Patent Document 2 as well, when this is to be attached to the mounting object such as an analyzer, it has been difficult to be attached with the optical axis aligned at a high accuracy with respect to the propagation path of an emitted light. Moreover, since the outer periphery surface of the tube body that houses the anode and cathode was covered with the mouth ring, a sufficient heat radiation performance could not be obtained, so that the amount of the emitted light was likely to become unstable.

In order to overcome the above-mentioned problems, it is an object of the present invention to provide a deuterium lamp with a structure to enable high-accuracy positioning with respect to a mounting object such as an analyzer (structure to realize a high-accuracy optical axis alignment on the propagation path of a discharge light). Further, it is an object of the present invention to provide a deuterium lamp to simultaneously realize a structure to effectively improve the heat radiation performance for stably emitting a discharge light generated between the anode and cathode and a structure to effectively reduce the possibility of breakage of the sealed container.

Means for Solving Problem

A deuterium lamp according to the present invention comprises, at least, a light-emitting portion, a sealed container having a storing space in which the light-emitting portion is stored while being filled with a deuterium gas, an axis adjusting member, and a sealing layer. The light emitting portion has a cathode and an anode for generating an electric discharge, and emits a discharge light in a predetermined direction. The sealed container comprises a hollow body portion and a hollow guide portion, and a storing space of the sealed container is constituted by internal spaces of the hollow body portion and hollow guide portion. The hollow body portion stores the light-emitting portion in its internal space. On the other hand, the hollow guide portion extends along an emitting direction of a discharge light from the hollow body portion with its internal space being directly communicated with the internal space of the hollow body portion, and has a hollow structure to guide a discharge light from the light-emitting portion stored in the hollow body portion to its front end. In addition, at this front end of the hollow guide portion, provided is a light exit window for emitting the discharge light to the outside Particularly, in said deuterium lamp, the axis adjusting member has a shape extending along a predetermined center axis (tube axis of the axis adjusting member) and at whose both ends openings are provided, and the axis adjusting member is fixed to the hollow guide portion while storing at least a part of the hollow guide portion. On the other hand, the sealing layer includes an adhesive material and is provided between an outer periphery surface of the hollow guide portion and an inner wall surface of the axis adjusting member. This sealing layer fixes the axis adjusting member to the hollow guide portion with the center axis of the axis adjusting member being made coincident with the emitting direction (optical axis of a discharge light) of a discharge light.

In accordance with the deuterium lamp having such a structure as described above, the sealing layer has been disposed between the outer periphery surface of the hollow guide portion and the inner wall surface of the axis adjusting member. By changing the thickness of this sealing layer, it becomes possible to arbitrarily set a fixing posture of the axis adjusting member to the hollow guide portion. At this time, misalignment between the center axis of the hollow guide portion and the propagation direction of a discharge light emitted from the light-emitting portion (emitting direction of a discharge light) is absorbed by the fixing posture of the axis adjusting member. That is, it becomes possible to fix the axis adjusting member to the hollow guide portion with the emitting direction of a discharge light (optical axis of a discharge light) being made coincident with the center axis (tube axis) of the axis adjusting member. As a result of the axis adjusting member whose center axis is coincident with the emitting direction of a discharge light being directly attached to a mounting object such as an analyzer, it becomes possible to position said deuterium lamp at a high accuracy with respect to the mounting object. That is, said deuterium lamp can be attached to the mounting object with the optical axis aligned at a high accuracy on the propagation path of a discharge light.

In addition, since the sealed container comprises the hollow body portion that houses the cathode and the anode and the hollow guide portion extending along the emitting direction of a discharge light from the hollow body portion and the axis adjusting member is attached to this hollow guide portion, the axis adjusting member itself never obstructs heat radiation and the hollow body portion is improved in heat radiation characteristics. As a result, it becomes possible to stably emit a discharge light.

Since the axis adjusting member is fixed to the hollow guide portion via the sealing layer, a stress that acts on the axis adjusting member is relieved by the sealing layer. As a result, the stress transmitted to the hollow guide portion is reduced, and the possibility of breakage of the sealed container is reduced. Here, a longitudinal sectional shape of the "axis adjusting member" may be a circular shape, a rectangular shape, and other polygonal shapes. Also, in this specification, the "center axis of the axis adjusting member" is an axis line that passes through the center of a section of the axis adjusting member and extends in the longitudinal direction of the axis adjusting member.

Here, the hollow guide portion has a shape protruded in a direction orthogonal to a center axis of the hollow body portion, and is provided with the light exit window at its front end. When the light exit window is located inside the axis adjusting member with the axis adjusting member storing at least a part of the hollow guide portion, the light exit window is protected by the axis adjusting member. Here, the "center axis of the hollow body portion" is an axis line that passes through the center of a section of the hollow body portion and extends in the longitudinal direction of the hollow body portion. Likewise, the "center axis of the hollow guide portion" is also an axis line that passes through the center of a section of the hollow guide portion and extends in the longitudinal direction of the hollow guide portion.

Furthermore, it is preferable that the sealing layer has a multilayer structure where plural of layers are laminated from a hollow body portion-side end portion of the hollow guide portion toward the front end. In this case, it is preferable that the sealing layer comprises a fixing layer for fixing the axis adjusting member to the hollow guide portion and a separating layer for separating a gap between the axis adjusting member and the hollow guide portion into a space including one end of the axis adjusting member and a space including the other end of the axis adjusting member. When the sealing layer has such a multilayer structure, as a result of the separating layer being formed after the axis adjusting member is temporarily fixed to the hollow guide portion by the fixing layer, one of the spaces in the axis adjusting member to be directly communicated with a vacuum chamber of the mounting object can be reliably sealed airtight. In addition, as a result of the sealing layer with such a multilayer structure being applied, it becomes easy to make the center axis of the axis adjusting member coincident with the emitting direction of a discharge light (optical axis of a discharge light emitted from said deuterium lamp into the vacuum chamber of the mounting object), so that it becomes possible to further improve the positional accuracy when attaching said deuterium lamp to the mounting object (corresponding to the accuracy of optical axis alignment on the propagation path of a discharge light).

Moreover, it is preferable that the sealing layer is located, inside the axis adjusting member, in an intermediate part of the hollow guide portion excluding both ends. In this case, since the sealing layer is to be located closer to the hollow body portion than the light exit window provided at the front end of the hollow guide portion, the adhesive material does not adhere to the light exit window when the sealing layer is formed, so that it becomes easy to form the sealing layer.

It is preferable that the axis adjusting member has a flange portion provided at the other end opposed to one end where the opening in which the hollow guide portion is inserted is located. In this case, said deuterium lamp can be fixed to the mounting object such as an analyzer reliably and easily.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effect of the Invention

By the deuterium lamp according to the present invention, when said deuterium lamp is attached to an analyzer or the like being a mounting object, said deuterium lamp is positioned with its optical axis adjusted at a high accuracy with respect to the mounting object. Moreover, since said deuterium lamp has a structure to improve heat radiation characteristics, it becomes possible to stably emit a discharge light. Further, since the hollow glide portion that guides a discharge light from the light-emitting portion to the light exit window is not directly fixed to the mounting object, the possibility of breakage of the sealed container in which the light-emitting portion is sealed is effectively reduced.

DESCRIPTION OF THE REFERENCE NUMERALS

1: analyzer; 10, 40, 60: deuterium lamp; 11: sealed container; 12: anode; 13: cathode; 15: hollow body portion; 17, 47: light exit window; 19, 49: hollow guide portion; 20, 70: fixing clasp (axis adjusting member); 21, 51: sealing layer; 51a: temporary fixing layer (fixing layer); 51b: separating layer; 70b: flange portion; X: optical axis; and L: tube axis.

BEST MODES FOR CARRYING OUT THE INVENTION

Figure 1:
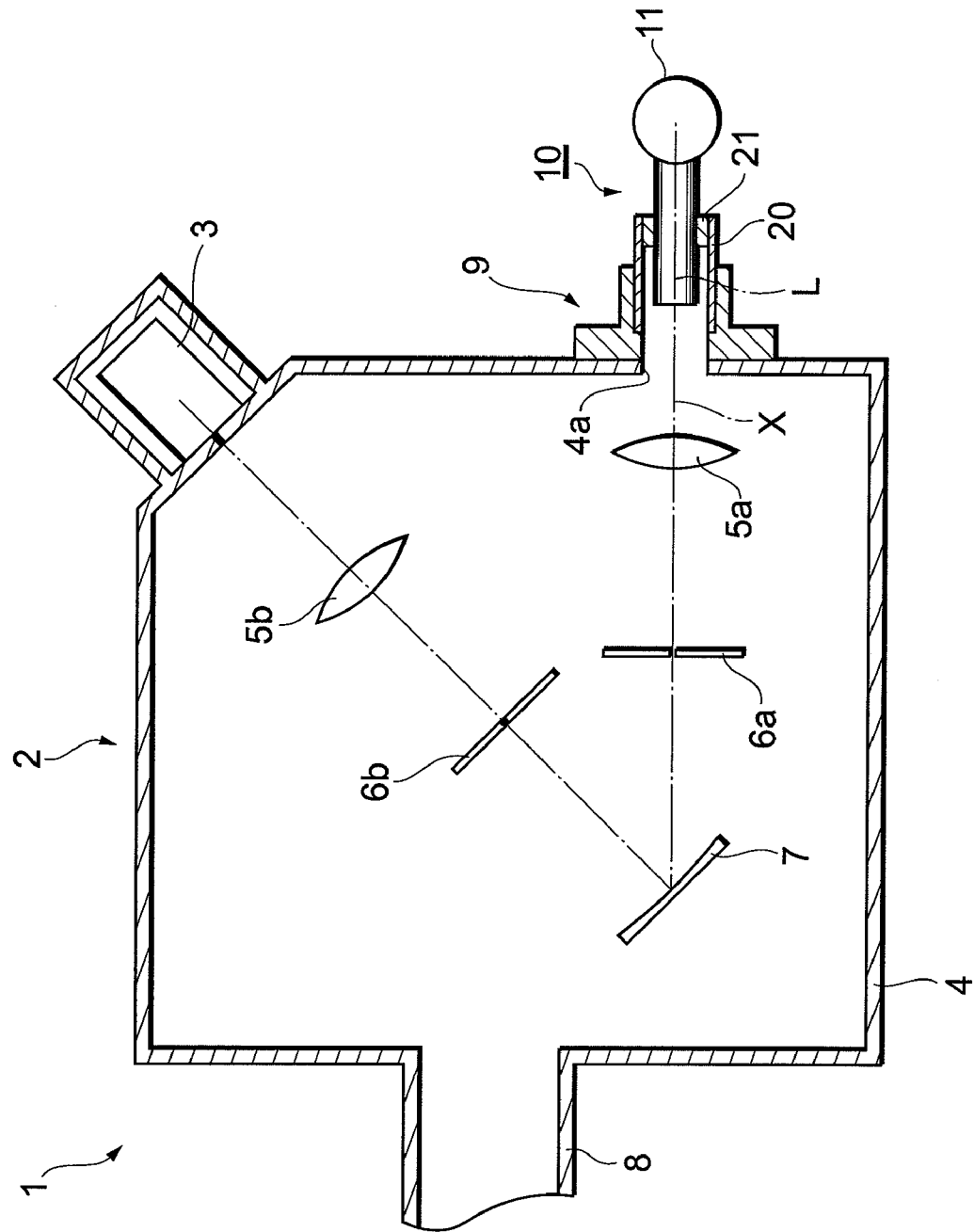
FIG. 1 is a cross sectional view showing a schematic configuration of an analyzer applied with a deuterium lamp according to the present invention.
Figure 2:
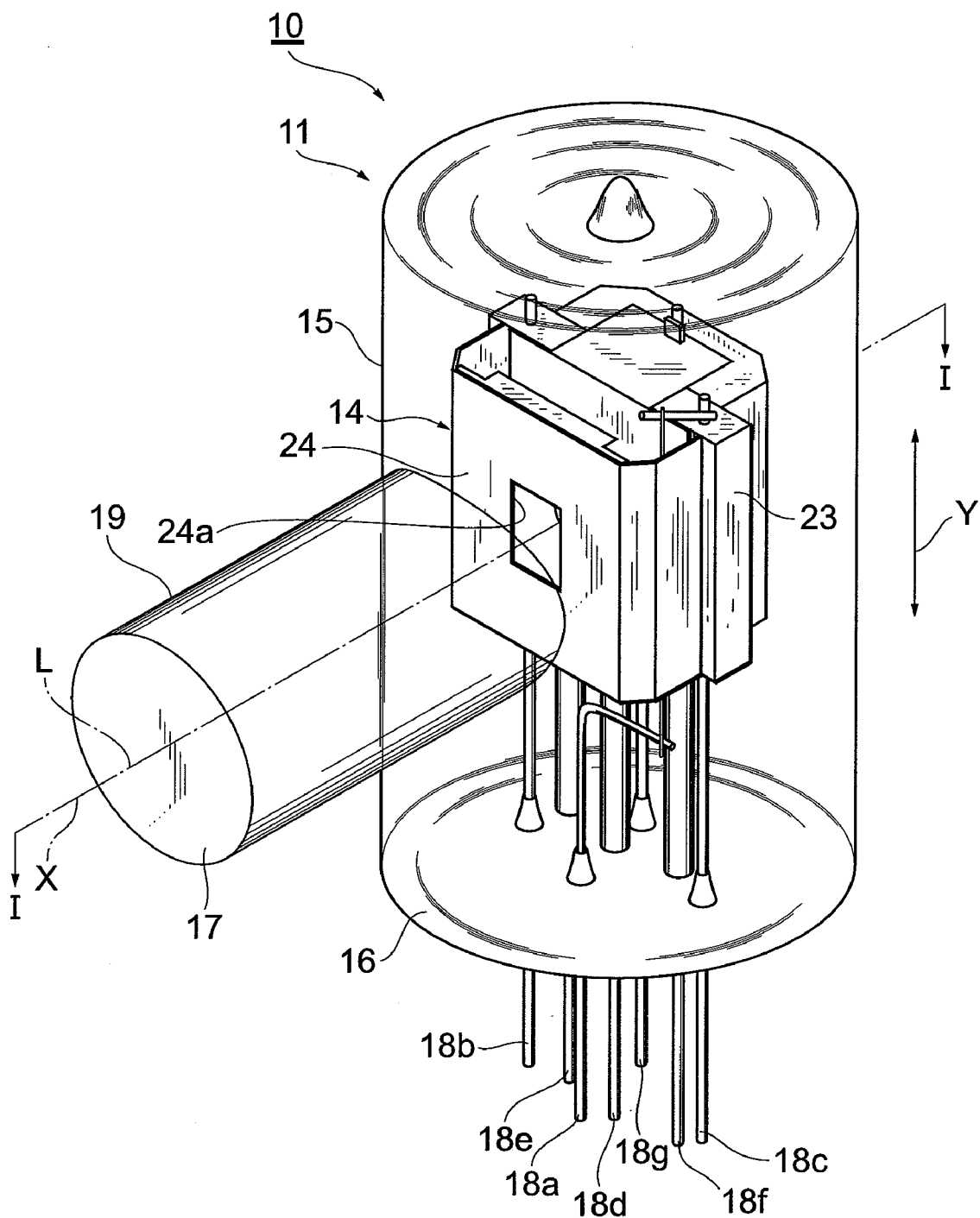
FIG. 2 is a perspective view showing a configuration of a first embodiment of a deuterium lamp according to the present invention.
Figure 3:
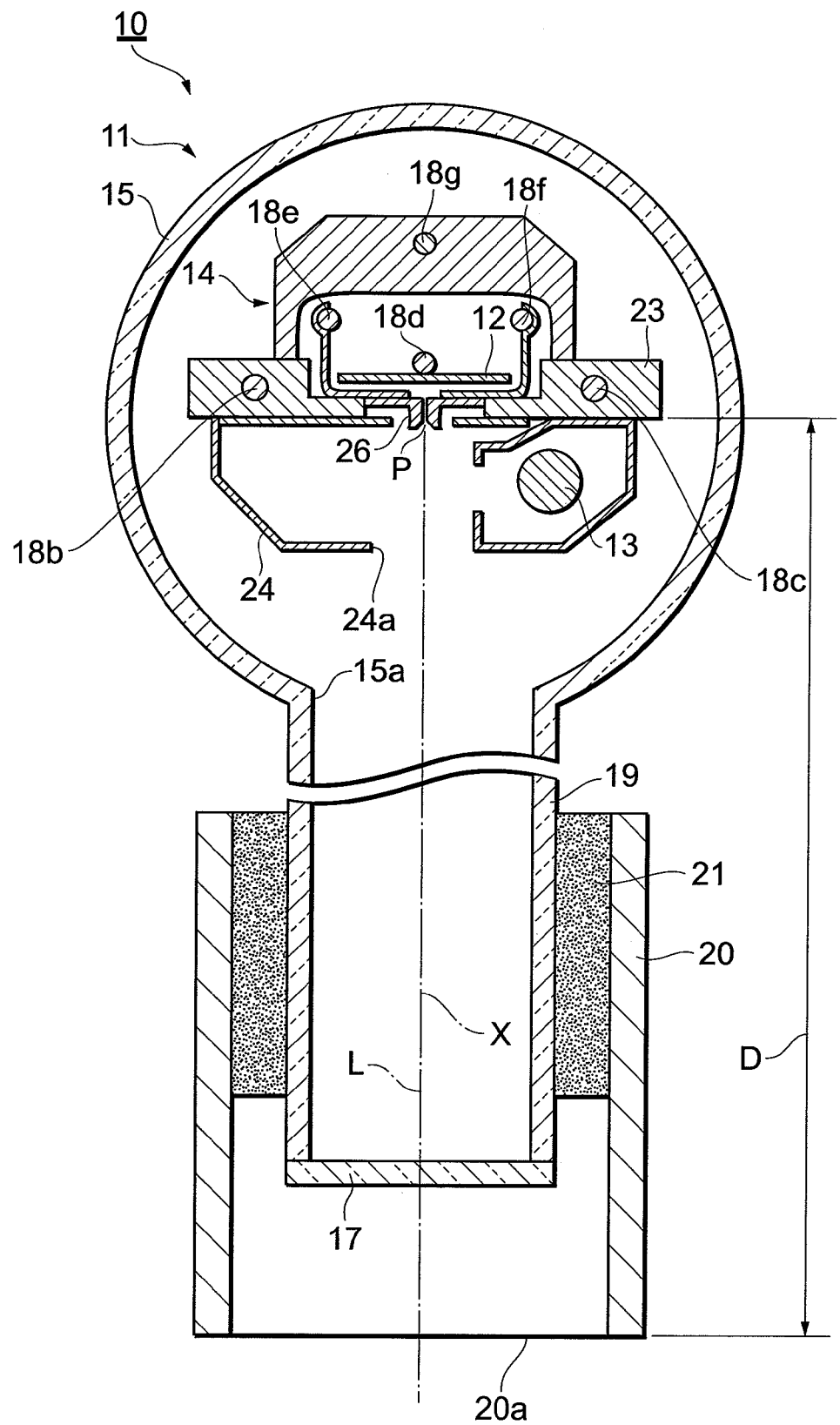
FIG. 3 is a view showing a sectional structure of the deuterium lamp according to the first embodiment along a line I-I shown in FIG. 2.
Figure 4:
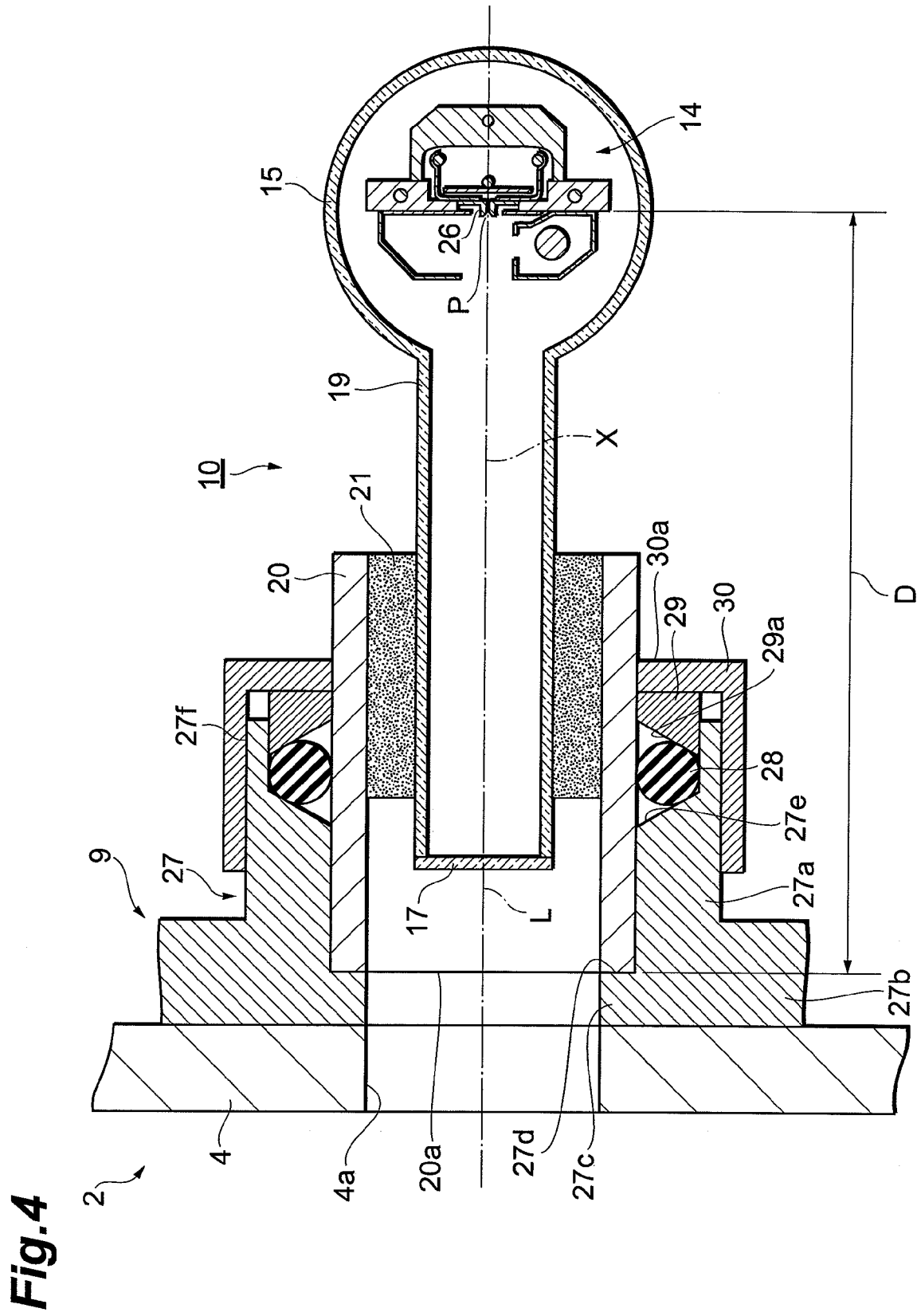
FIG. 4 is a view showing a sectional structure of the deuterium lamp according to the first embodiment and a lamp holder that holds this deuterium lamp (corresponding to a section along the line I-I shown in FIG. 2)

In the following, embodiments of a deuterium lamp according to the present invention will be explained in detail with reference to FIGS. 1 to 6. In the explanation of the drawings, constituents identical to each other will be referred to with numerals identical to each other without repeating their overlapping descriptions. FIG. 1 is a cross sectional view showing a schematic configuration of an analyzer applied with a deuterium lamp according to the present invention. FIG. 2 is a perspective view showing a configuration of a first embodiment of a deuterium lamp according to the present invention. FIG. 3 is a view showing a sectional structure of the deuterium lamp according to the first embodiment along a line I-I shown in FIG. 2. FIG. 4 is a view showing a sectional structure of the deuterium lamp according to the first embodiment and a lamp holder that holds this deuterium lamp (corresponding to a section along the line I-I shown in FIG. 2). Also, in the following description, the propagation direction (emitting direction) of an emitted light is determined as "forward," and words standing for directions, such as "front," "rear," "front face," and "rear face," are used, while words denoting directions such as "upper" and "lower," refer to the conditions of the respective figures.

As shown in FIG. 1, an analyzer 1 comprises a deuterium lamp 10 that emits ultraviolet light, a spectroscope 2 that separates an emitted light from the deuterium lamp 10, and a photodetector 3 that detects light separated by the spectroscope 2.

The spectroscope 2 has a case 4 that is capable of maintaining its internal space in a predetermined vacuum environment (low-pressure state depressurized to a predetermined vacuum), and lenses 5a and 5b, slits 6a and 6b, and a grating 7 are stored in this case 4. The case 4 is connected to a vacuum pump via a communication pipe 8, and its internal space is maintained at a predetermined vacuum. And, an emitted light from the deuterium lamp 10 is propagated through the lens 5a, the slit 6a, the grating 7, the slit 6b, and the lens 5b in sequence and then separated, and separated respective light components are detected by the photodetector 3. Here, the internal space of the case 4 may be filled with a rare gas.

In an outer wall of the case 4 opposed to the lens 5a, provided is a light entrance 4a to take in an emitted light from the deuterium lamp 10, and to an outer wall part that defines this entrance 4a, attached is a lamp holder 9 for holding the deuterium lamp 10. Here, details of the lamp holder 9 will be described later.

Next, the deuterium lamp 10 will be described in detail. As shown in FIG. 2 (However, a fixing clasp 20 and a sealing layer 21 to be described later are omitted in FIG. 2.) and FIG. 3, the deuterium lamp 10 is a so-called side-on type deuterium lamp that emits ultraviolet light from the side surface of a sealed container. This deuterium lamp 10 comprises a glass-made sealed container filled with a deuterium gas on the order of several hundred pascals. This sealed container 11 is constituted by a hollow body portion 15 that houses a light-emitting part assembly 14 to emit ultraviolet light and a circular cylindrical-shaped hollow guide portion 19 whose one end is coupled to the hollow body portion 15 and whose front end is protruded forward (direction coincident with an optical axis X of an emitted light: direction orthogonal to a center axis direction Y of the hollow body portion 15). And, a front-face side of this hollow guide portion 19 is sealed by a light exit window 17 from which ultraviolet light is emitted.

The hollow body portion 15 has, as shown in FIG. 2, a circular cylindrical shape whose one end (upper end in the illustration) is sealed, and the other end side is sealed by a stem portion 16. On the front face of the hollow body portion 15, formed is an opening portion 15a (see FIG. 3) coupled with one end of the hollow guide portion 19, and via this opening portion 15a, an internal space of the hollow body portion 15 and an internal space of the hollow guide portion 19 are directly communicated with each other. To the stem portion 16, fixed airtight are a plurality of (in this embodiment, seven) conductive stem pins 18a to 18g in a manner pierced therethrough, respectively. These stem pins 18a to 18g extend along the center axis direction Y (upper and lower direction in the illustration) of the hollow body portion 15.

The light-emitting portion assembly 14 housed in the hollow body portion 15 generates an arc discharge and emits a discharge light (ultraviolet light) caused by this arc discharge. Concretely, the light-emitting portion assembly 14 comprises, as shown in FIG. 3, a cathode 13 that generates thermions contributing to an electric discharge, an anode 12 that accepts thermions from the cathode 13, a discharge path restricting portion 26 that restricts a discharge path between the cathode 13 and the anode 12, a discharge path restricting portion supporting member 23 that supports the discharge path restricting portion 26, and a front cover 24 that covers the front-face side of the discharge path restricting portion supporting member 23 and is formed with a light passing port 24a through which ultraviolet light passes.

The discharge path restricting portion supporting member 23 is comprised of ceramic having electrical insulation properties and is supported by the stem pins 18b and 18c, while said discharge path restricting portion supporting member 23 supports the discharge path restricting portion 26 within an opening portion located in the vicinity of its center. The discharge path restricting portion 26 is comprised of a conductive material, for example, a high-melting point metal such as molybdenum, tungsten, or an alloy made from these. In addition, the discharge path restricting portion 26 is electrically connected to the stem pins 18e and 18f. The anode 12 is disposed on the rear-face side of the discharge path restricting portion 26, and this anode 12 is supported and electrically connected by the stem pin 18d.

The cathode 13 includes a tungsten coil, whose surface is applied with an electron emissive material to generate thermions. The cathode 13 is disposed, on the front-face side (lower side in the illustration) further than the discharge path restricting portion supporting member 23, at a position away from the optical axis X, and is electrically connected to the stem pins 18a and 18c (see FIG. 2). In addition, the cathode 13 is covered at its front-face side with the front cover 24 to prevent a sputtered material and a vaporized material generated from the cathode 13 from adhering to the light exit window 17.

Here, said deuterium lamp 10 comprises a fixing clasp (axis adjusting member) 20 being a stainless steel tube. This fixing clasp 20 is fixed to the hollow guide portion 19 while storing at least a part of the hollow guide portion 19. In a gap between an inner wall surface of the fixing clasp 20 and an outer periphery surface of the hollow guide portion 19, disposed is a sealing layer 21 including an adhesive material. By this sealing layer 21, the fixing clasp 20 is fixed to the outer periphery surface of the hollow guide portion 19 so that the optical axis X of an emitted light becomes coincident with a tube axis of the fixing clasp 20.

A front end face 20a of the fixing clasp 20 is a flat surface and is located forward further than the light exit window 17. A distance D between the front end face 20a and a light-emitting point P in the discharge path restricting portion 26 of the light-emitting portion assembly 14 is set to a desired value. Since the front end face 20a of the fixing clasp 20 is located forward further than the light exit window 17, the light exit window 17 is protected by the fixing clasp 20.

The sealing layer 21 is formed, in the optical axis X direction, from the rear end of the fixing clasp 20 to the vicinity of the front end of the hollow guide portion 19 while being formed across the entire circumference of the hollow guide portion 19. By this configuration, the gap between the inner wall surface of the fixing clasp 20 and the outer periphery surface of the hollow guide portion 19 is sealed airtight. That is, the inside of the fixing clasp 20 is sealed airtight by the sealing layer 21 in order to maintain a vacuum state of the inside of the spectroscope 2. Since the sealing layer 21 is formed up to the vicinity of the front end of the hollow guide portion 19, and since the light exit window 17 is located forward further than the sealing layer 21, the adhesive material does not adhere to the light exit window 17 when forming the sealing layer 21, so that it becomes easy to form the sealing layer 21.

Next, a method for fixing the fixing clasp 20 to the hollow guide portion 19 will be described. First, in a front view, a discharge path narrowing pinhole of the discharge path restricting portion 26 is confirmed by use of a camera or the like, and alignment of the fixing clasp 20 with the hollow guide portion 19 is performed in terms of a direction orthogonal to the optical axis direction X so that the tube axis (center axis) of the fixing clasp 20 becomes coincident with the optical axis X (emitting direction of an ultraviolet light from the light-emitting portion assembly 14). Next, in terms of the optical axis direction X, performed is alignment of the fixing clasp 20 with the hollow guide portion 19 so that the distance D between the front end face 20a of the fixing clasp 20 and the light-emitting point P of the light-emitting portion assembly 14 becomes a predetermined value. Then, in the gap between the inner wall surface of the fixing clasp 20 and the outer periphery surface of the hollow guide portion 19, the adhesive material that forms the sealing layer 21 is filled. As a result of this adhesive material being cured by heating, the fixing clasp 20 is adhered and fixed to the hollow guide portion 19. Through the above process, the deuterium lamp 10 wherein the optical axis X is coincident with the center axis of the fixing clasp 20 can be obtained.

Next, the lamp holder 9 for fixing the deuterium lamp 10 thus configured to the spectroscope 2 (see FIG. 1) will be described. This lamp holder 9 comprises, as shown in FIG. 4, a lamp holder body 27, an O-ring 28, a spacer 29, and a tightening member 30. Here, the lamp holder body 27 is fixed to the outer wall of the case 4 that forms a part of the spectroscope 2 and holds the fixing clasp 20 of the deuterium lamp 10. The spacer 29 has an annular shape and is disposed behind the O-ring 28. The tightening member 30 functions so as to tighten the O-ring 28 by pressing the spacer 29 from behind.

The lamp holder body 27 comprises a cylinder 27a in which the fixing clasp 20 is inserted. At the front end of this cylinder 27a, provided is a flange 27b for fixing the lamp holder body 27 to the spectroscope 2. Moreover, at the front end of the cylinder 27a, formed is a flange portion 27c protruding in an annular shape toward a center axis of the cylinder 27a, and a rear face 27d of this flange portion 27c is a flat surface against which the front end 20a of the fixing clasp 20 is pressed. The inside diameter of the cylinder 27a is set to almost the same diameter as the outside diameter of the fixing clasp 20. Also, an inclined surface 27e is provided on an inner wall surface located at an intermediate part of the cylinder 27a, and a rear end-side opening of the cylinder 27a is enlarged in size to the extent that the spacer 29 can be inserted. In addition, on an outer periphery surface 27f of the cylinder 27a, formed is a screw portion for being screwed with the tightening member 30.

The spacer 29 has a trapezoidal longitudinal sectional shape, and on the front side of the spacer 29, provided is an inclined surface 29a inclined from the inner wall surface toward the outer periphery surface. And, the O-ring 28 is disposed while being sandwiched between the inclined surface 27e of the lamp holder 27 and the inclined surface 29a of the spacer 29.

The tightening member 30 is a circular cylinder, at the rear end of which an annular-shaped flange portion 30a protruded toward the inside and for pressing the spacer 29 from behind is provided.

For an attachment of said deuterium lamp 10 to the lamp holder 9 having such a structure as in the above, first, the fixing clasp 20 of the said deuterium lamp 10 is inserted in the cylinder 27a of the lamp holder body 27. Subsequently, while the front end face 20a of the fixing clasp 20 is struck against the rear face 27d of the flange portion 27c of the lamp holder body 27, the tightening member 30 is screwed with the lamp holder body 27. Thereby, the spacer 29 is pressed, and the O-ring 28 is tightened. Through the above mounting process, the fixing clasp 20 of the deuterium lamp 10 is fixed to the lamp holder 9 of the spectroscope 2 reliably and airtight. At this time, the optical axis X of the deuterium lamp 10 has been aligned with the lens 5a in the spectroscope 2 at a high accuracy.

In the analyzer 1 attached with the deuterium lamp 10 having such a structure as described above, as a result of electricity being supplied to the deuterium lamp 10, an arc discharge is generated between the anode 12 and the cathode 13. This arc discharge is converged by the discharge path restricting portion 26, and ultraviolet light being a discharge light is emitted from the light exit window 17. The ultraviolet light emitted from the light exit window 17 passes through the inside of the fixing clasp 20 and the light entrance 4a, and is accurately made incident into the lens 5a (see FIG. 1) in the spectroscope 2 without axial misalignment.

As such, according to said deuterium lamp 10, even when, for example, misalignment between the center axis (tube axis L) of the hollow guide portion 19 and the optical axis X of an emitted light due to a manufacturing error in manufacturing of the container or the like has occurred, the fixing clasp 20 can be attached to the lamp holder 9 of the spectroscope 2 with the optical axis of the optical system in the spectroscope 2 being made coincident with the optical axis X at a high accuracy. That is, since the sealing layer 21 has been disposed between the outer periphery surface of the hollow guide portion 19 and the inner wall surface of the fixing clasp 20, by changing the thickness in the circumferential direction of this sealing layer 21, a fixing posture of the fixing clasp 20 to the hollow guide portion 19 can be adjusted (the fixing clasp 20 can be fixed to the hollow guide portion 19 with the center axis of the fixing clasp 20 being made coincident with the optical axis X of an emitted light). Thus, since misalignment between the tube axis L of the hollow guide portion 19 and the optical axis X of an emitted light is absorbed by the fixing clasp 20, by attaching the fixing clasp 20 to the lamp holder 9 of the spectroscope 2, a highly accurate optical axis alignment is realized between said deuterium lamp 10 being a light source and the optical system in the spectroscope 2. In other words, the deuterium lamp 10 can be positioned at a high accuracy with respect to the lens 5a or the like in the spectroscope 2.

In addition, the sealed container 11 is constituted by the hollow body portion 15 that houses the cathode 13 and the anode 12 and the hollow guide portion 19 coupled to this hollow body portion 15 and extending along the optical axis X direction of an emitted light. Furthermore, since the fixing clasp 20 has been inserted in the hollow guide portion 19 so as to cover the outer periphery surface of the hollow guide portion 19, the fixing clasp 20 itself never obstructs heat radiation of the hollow body portion 15. Therefore, the light-emitting portion assembly 14 in the hollow body portion 15 is improved in heat radiation performance, and an emitted light with a small time fluctuation in the light amount can be stably obtained. In addition, since the fixing clasp 20 is fixed to the hollow guide portion 19 via the sealing layer 21, a stress that acts on the fixing clasp 20 is relieved by the sealing layer 21. As a result, the stress transmitted to the hollow guide portion 19 is reduced, and the possibility of breakage of the sealed container 11 is reduced. Concretely, since a stress that acts on the sealed container 11 when attaching and detaching the deuterium lamp 10 with respect to the spectroscope 2 is reduced, breakage of the sealed container 11 is prevented, so that a longer operating life of the deuterium lamp 10 can be realized.

Figure 5:
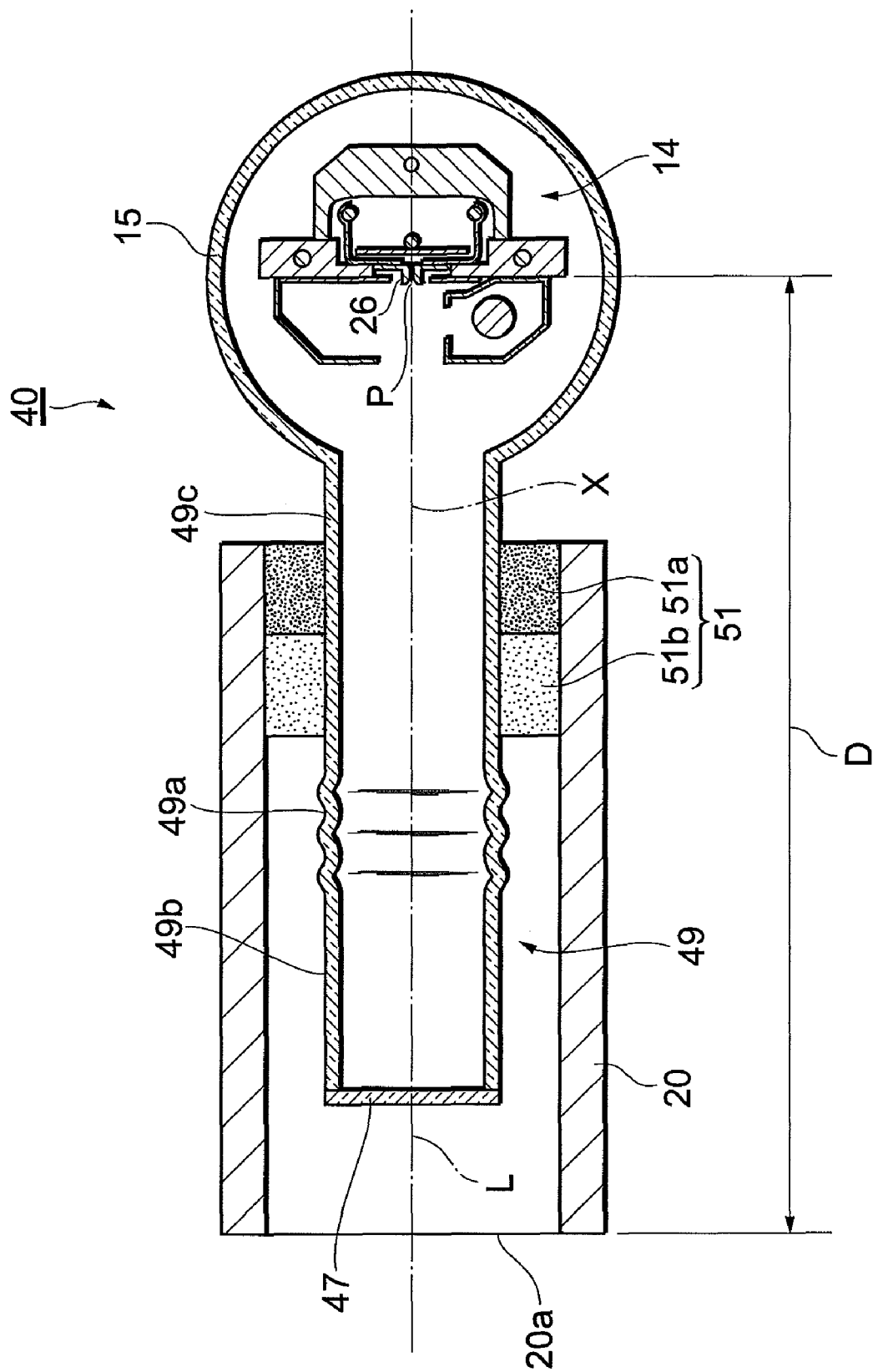
FIG. 5 is a view showing a sectional structure of a second embodiment of a deuterium lamp according to the present invention (corresponding to a section along the line I-I shown in FIG. 2)

Next, a second embodiment of a deuterium lamp according to the present invention will be described with reference to FIG. 5. A deuterium lamp 40 according to the second embodiment differs in structure from the deuterium lamp 10 according to the first embodiment in the point that a hollow guide portion 49 obtained by coupling members comprised of different materials to each other in a stepped seal portion 49a was applied in place of the hollow guide portion 19 comprised of a single material and the point that a sealing layer 51 constituted by two layers is applied in place of the sealing layer 21 constituted by one layer.

A front end side of the hollow guide portion 49 is sealed by a light exit window 47 that emits ultraviolet light. This light exit window 47 is comprised of, for example, magnesium fluoride ($MgF_2$). Moreover, in the hollow guide portion 49, a front half portion 49b provided with the light exit window 47 is comprised of magnesium fluoride, and a rear half portion 49c coupled to the hollow body portion 15 is comprised of, for example, borosilicate glass. The magnesium fluoride and borosilicate glass greatly differ in the coefficient of thermal expansion from each other, so that when the magnesium fluoride and borosilicate glass are directly fusion bonded, there is a possibility of breaking and cracking in the fusion bonding portion. Therefore, provided is the stepped seal portion 49a in an intermediate portion between the front half portion 49b and the rear half portion 49c. This stepped seal portion 49a, as a result of a plurality of types of intermediate glasses being employed, performs sealing so that the coefficient of thermal expansion gradually changes.

The sealing layer 51 has a structure of two layers adjacent in the front and rear direction (direction along the tube axis L of the hollow guide portion 49). This sealing layer 51 comprises a temporary fixing layer (fixing layer) 51a that is formed on the hollow body portion 15 side and temporarily fixes the fixing clasp 20 and a separating layer 51b formed on the front side further than the temporary fixing layer 51a. The separating layer 51b functions so as to separate a gap between the outer periphery surface of the hollow guide portion 49 and the inner wall surface of the fixing clasp 20 into two front and rear spaces. It is preferable that the temporary fixing layer 51a is comprised of a temporary fixing adhesive material that requires a short curing time and has a great hardness after being cured. As this temporary fixing adhesive material, for example, a silica-alumina-based inorganic adhesive can be mentioned.

It is preferable that the separating layer 51b is comprised of a sealing adhesive material (sealant) having a high airtightness, having no gas emission in itself, and having no moisture absorption characteristics. As this sealing adhesive material (sealant), for example, an epoxy-based adhesive can be mentioned. Here, the front end of the separating layer 51b is located rearward further than the stepped seal portion 49a, and the stepped seal portion 49a is disposed without being covered by the sealing layer 51.

Subsequently, a method for fixing the fixing clasp 20 to the hollow guide portion 49 will be described. First, in a front view, a discharge path narrowing pinhole of the discharge path restricting portion 26 is confirmed by use of a camera or the like, and alignment of the fixing clasp 20 with the hollow guide portion 49 is performed in terms of a direction orthogonal to the optical axis direction X so that the tube axis (center axis) of the fixing clasp 20 becomes coaxial with the optical axis X of an emitted light. Subsequently, in terms of the optical axis direction X, performed is alignment of the fixing clasp 20 with the hollow guide portion 49 so that the distance D between the front end face 20a of the fixing clasp 20 and the light-emitting point P of the light-emitting portion assembly 14 becomes a predetermined value. Then, in the gap between the inner wall surface of the fixing clasp 20 and the outer periphery surface of the hollow guide portion 49, the temporary fixing adhesive material that forms a part (temporary fixing layer 51a) of the sealing layer 51 is filled. As a result of this temporary fixing adhesive material being cured by heating, the fixing clasp 20 is adhered and fixed to the hollow guide portion 49. When a silica-alumina-based inorganic adhesive is used as the temporary fixing adhesive material, for curing the temporary fixing adhesive material, a heating temperature of approximately 100° C. and a heating time of approximately one minute are necessary.

Subsequently, from the front, the sealing adhesive material is filled in the gap between the inner wall surface of the fixing clasp 20 and the outer periphery surface of the hollow guide portion 49, and by curing this sealing adhesive material, the separating layer 51b is formed. When an epoxy-based adhesive is used as the sealing adhesive material, for curing the sealing adhesive material, it is sufficient to left stand the same for approximately two hours at room temperature. Through the above process, the deuterium lamp 40 wherein the optical axis X of an emitted light is coincident with the tube axis (center axis) of the fixing clasp 20 can be obtained.

Even the deuterium lamp 40 with such a structure as in the above can obtain the same effects as those of the deuterium lamp 10 according to the first embodiment described above. In addition, the sealing layer 51 has a multilayer structure constituted by two front and rear layers (the fixing layer 51a that fixes the fixing clasp 20 and the separating layer 51b disposed on the front side further than this fixing layer 51a). Therefore, as a result of the separating layer 51b being formed after the fixing clasp 20 is temporarily fixed to the hollow guide portion 49 by the fixing layer 51a, airtight sealing of the inside of the spectroscope can be reliably performed. Furthermore, it becomes easy to make the tube axis of the fixing clasp 20 coincident with the optical axis X of an emitted light, so that the accuracy of an attaching position of the deuterium lamp 40 to the spectroscope or the like being a mounting object can be further improved.

In addition, since the temporary fixing layer 51a is comprised of the temporary fixing adhesive material, this can be cured in a short time (on the order of a few minutes), so that workability in fabrication of the deuterium lamp 40 can be improved. In addition, since the temporary fixing adhesive material has a great hardness after being cured, this can prevent misalignment of the deuterium lamp 40 with the mounting object such as a spectroscope.

In addition, since the separating layer 51b is comprised of the sealing adhesive material, this has airtightness and is capable of coping with a high-vacuum environment in the spectroscope to which the deuterium lamp 40 is attached. In addition, since the sealing adhesive material has no gas emission, no component elution of the adhesive material occurs, so that pollution of the vacuum environment is prevented. In addition, since the sealing adhesive material has no moisture absorption characteristics, this can cope with a high-vacuum environment.

Figure 6:
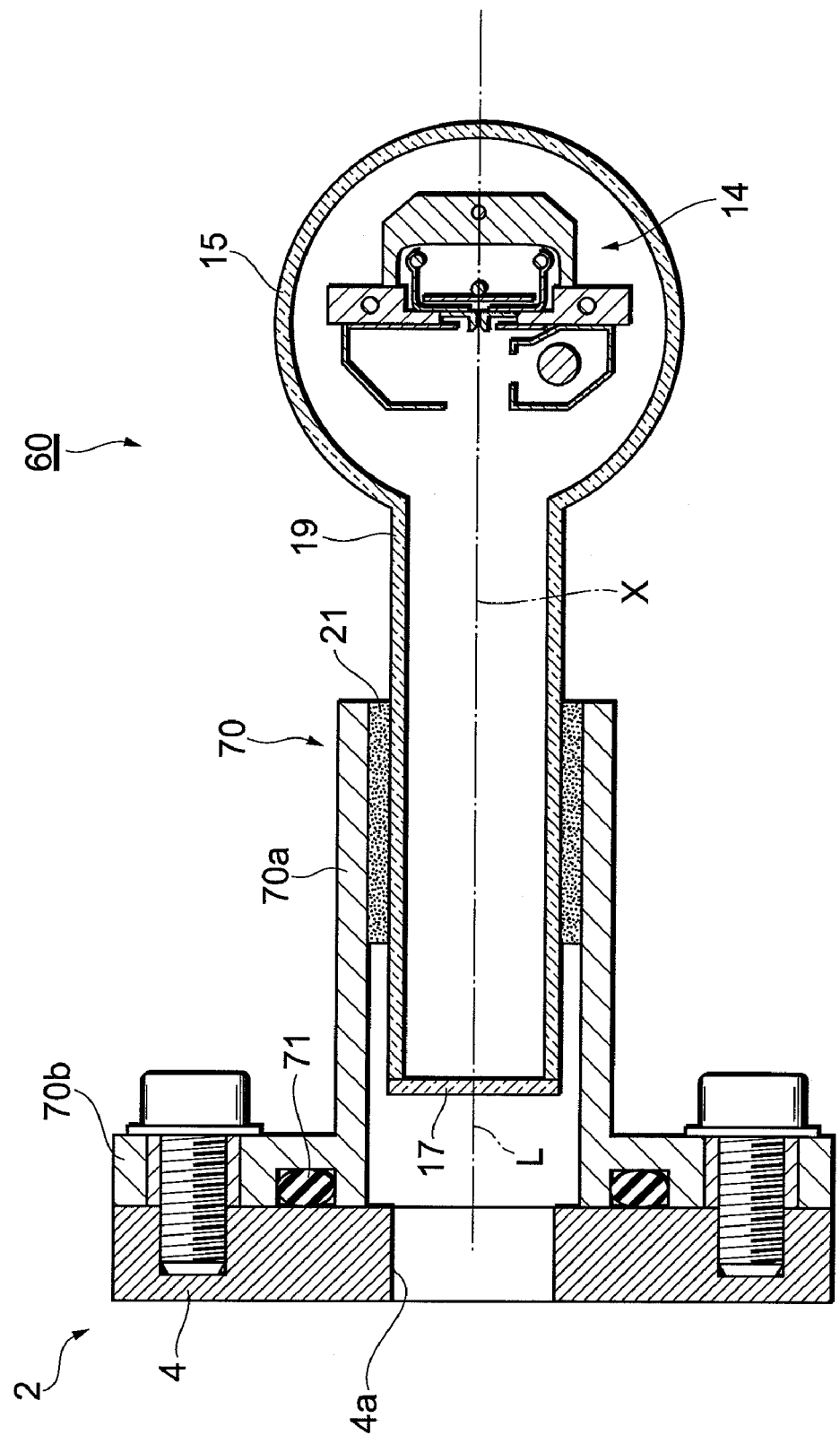
FIG. 6 is a view showing a sectional structure of a third embodiment of a deuterium lamp according to the present invention (corresponding to a section along the line I-I shown in FIG. 2).

Next, a third embodiment of a deuterium lamp according to the present invention will be described with reference to FIG. 6. A deuterium lamp 60 according to the third embodiment differs in structure from the deuterium lamp 10 according to the first embodiment 10 in the point that a fixing clasp 70 for which a flange portion 70b is provided at the front end of a circular cylinder 70a is applied in place of the circular cylindrical-shaped fixing clasp 20. The deuterium lamp 60 according to the third embodiment is positioned as a result of the flange portion 70b being fixed to the outer wall of the case 4 of the spectroscope 2. In addition, a gap between an outer surface of the case 4 and an installation surface of the flange portion 70b is sealed by an O-ring 71.

The deuterium lamp 60 with such a structure can also obtain the same effects as those of the deuterium lamp 10 according to the first embodiment. In addition, since the flange 70b is provided at the front end in the fixing clasp 70, the deuterium lamp 60 can be fixed to the mounting object such as the spectroscope 2 reliably and easily.

In the above, respective embodiments of a deuterium lamp according to the present invention have been described in detail, however, the deuterium lamp according to the present invention is not limited to such embodiments as described above. In the embodiments described above, the side-on type deuterium lamps have been applied, however, head-on type deuterium lamps may be applied.

Moreover, in the embodiments described above, for the deuterium lamp 10, 40, 60, as a structure where the light exit window 17, 47 is protected, the front end of the axis adjusting member (fixing member) 20, 70 has been protruded forward further than the light exit window 17, 47, however, the light exit window may be protruded forward further than the axis adjusting member.

Moreover, in the embodiments described above, the axis adjusting member (fixing clasp) is comprised of a metal such as a stainless steel tube, however, the axis adjusting member may be comprised of other materials. In addition, the axis adjusting member may have a sectional shape such as a rectangular shape besides a circular shape.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

INDUSTRIAL APPLICABILITY

The deuterium lamp according to the present invention can be applied to ultraviolet light sources of various analyzers, such as a liquid chromatographic adsorption detector and a spectrophotometer.

The invention claimed is:

1. A deuterium lamp comprising:
a light-emitting portion having a cathode and an anode for generating an electric discharge, and emitting a discharge light toward a predetermined direction;
a sealed container having a storing space in which said light-emitting portion is stored while being filled with a deuterium gas, said sealed container having a hollow body portion for which said light-emitting portion is stored in an internal space constituting a part of the storing space, and a hollow guide portion extending along an emitting direction of a discharge light from said hollow body portion with its internal space being directly communicated with the internal space of said hollow body portion and on whose front end a light exit window for emitting the discharge light out side is provided;
an axis adjusting member extending along a predetermined center axis and at whose both ends openings are provided, said axis adjusting member being fixed to said hollow guide portion while storing at least a part of said hollow guide portion, said axis adjusting member having a reference surface giving an indication of the emitting direction of the discharge light; and
a sealing layer including an adhesive material, provided between an outer periphery surface of said hollow guide portion and an inner wall surface of said axis adjusting member, said sealing layer fixing said axis adjusting member to said hollow guide portion with the center axis of said axis adjusting member being made coincident with the emitting direction of the discharge light.

2. A deuterium lamp according to claim 1, wherein said hollow guide portion has a shape extending along a direction orthogonal to a center axis of the hollow body portion, and
wherein a hollow body portion-side end portion of said hollow guide portion is coupled to an outer periphery surface of said hollow body portion such that the internal space of said hollow guide portion forms the storing space in conjunction with the internal space of said hollow body portion.

3. A deuterium lamp according to claim 2, wherein said axis adjusting member is fixed to said hollow guide while storing said light exit window.

4. A deuterium lamp according to claim 1, wherein said sealing layer is located, inside said axis adjusting member, in an intermediate part of said hollow guide portion excluding both ends.

5. A deuterium lamp according to claim 1, wherein said axis adjusting member has a flange portion provided at the other end opposed to one end where the opening in which said hollow guide portion is inserted is located.

6. A deuterium lamp according to claim 1, wherein said sealing layer is cured after being filled within a space between the outer periphery surface of said hollow guide portion and the inner wall surface of said axis adjusting member.

7. A deuterium lamp comprising:
a light-emitting portion having a cathode and an anode for generating an electric discharge, and emitting a discharge light toward a predetermined direction;
a sealed container having a storing space in which said light-emitting portion is stored while being filled with a deuterium gas, said sealed container having a hollow body portion for which said light-emitting portion is stored in an internal space constituting a part of the storing space, and a hollow guide portion extending along an emitting direction of a discharge light from said hollow body portion with its internal space being directly communicated with the internal space of said hollow body portion and on whose front end a light exit window for emitting the discharge light out side is provided;
an axis adjusting member extending along a predetermined center axis and at whose both ends openings are provided, said axis adjusting member being fixed to said hollow guide portion while storing at least a part of said hollow guide portion; and
a sealing layer including an adhesive material, provided between an outer periphery surface of said hollow guide portion and an inner wall surface of said axis adjusting member, said sealing layer fixing said axis adjusting member to said hollow guide portion with the center axis of said axis adjusting member being made coincident with the emitting direction of a discharge light,
wherein said sealing layer has a multilayer structure where plural layers are laminated from a hollow body portion-side end portion of said hollow guide portion toward the front end, said sealing layer including, at least, a fixing layer for fixing said axis adjusting member to said hollow guide portion and a separating layer for separating a gap between said axis adjusting member and said hollow guide portion into a space including one end of said axis adjusting member and a space including the other end of said axis adjusting member.

8. A deuterium lamp according to claim 7, wherein said hollow guide portion has a shape extending along a direction orthogonal to a center axis of the hollow body portion, and
wherein a hollow body portion-side end portion of said hollow guide portion is coupled to an outer periphery surface of said hollow body portion such that the internal space of said hollow guide portion forms the storing space in conjunction with the internal space of said hollow body portion.

9. A deuterium lamp according to claim 8, wherein said axis adjusting member is fixed to said hollow guide while storing said light exit window.

10. A deuterium lamp according to claim 7, wherein said sealing layer is located, inside said axis adjusting member, in an intermediate part of said hollow guide portion excluding both ends.

11. A deuterium lamp according to claim 7, wherein said axis adjusting member has a flange portion provided at the other end opposed to one end where the opening in which said hollow guide portion is inserted is located.

12. A deuterium lamp according to claim 7, wherein said sealing layer is cured after being filled within a space between the outer periphery surface of said hollow guide portion and the inner wall surface of said axis adjusting member.

* * * * *